(12) United States Patent
Lee et al.

(10) Patent No.: US 11,448,517 B2
(45) Date of Patent: Sep. 20, 2022

(54) APPARATUS AND METHOD FOR CONTROLLING MULITMEDIA OF VEHICLE

(71) Applicants: HYUNDAI MOTOR COMPANY, Seoul (KR); KIA MOTORS CORPORATION, Seoul (KR)

(72) Inventors: Jae Yeol Lee, Incheon (KR); Jea Won Han, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 175 days.

(21) Appl. No.: 16/293,249

(22) Filed: Mar. 5, 2019

(65) Prior Publication Data

US 2020/0173807 A1 Jun. 4, 2020

(30) Foreign Application Priority Data

Dec. 4, 2018 (KR) ........................ 10-2018-0154729

(51) Int. Cl.
| | | |
|---|---|---|
| *G01C 21/36* | (2006.01) | |
| *G08G 1/0969* | (2006.01) | |
| *H04W 4/40* | (2018.01) | |
| *G08G 1/0968* | (2006.01) | |

(52) U.S. Cl.
CPC ..... *G01C 21/3647* (2013.01); *G01C 21/3602* (2013.01); *G01C 21/3617* (2013.01); *G08G 1/0969* (2013.01); *G08G 1/096894* (2013.01); *H04W 4/40* (2018.02)

(58) Field of Classification Search
CPC ............ G01C 21/3647; G01C 21/3602; G01C 21/3617; G01C 21/3655; H04W 4/40; G08G 1/0969; G08G 1/096894
See application file for complete search history.

(56) References Cited

U.S. PATENT DOCUMENTS

| | | | | |
|---|---|---|---|---|
| 5,539,429 | A * | 7/1996 | Yano | B60R 16/0231 340/990 |
| 8,103,442 | B2 * | 1/2012 | Akita | G01C 21/3647 701/457 |
| 8,395,522 | B2 * | 3/2013 | Kweon | B60K 35/00 340/670 |
| 9,513,702 | B2 * | 12/2016 | Cho | B60K 35/00 |
| 9,610,934 | B2 * | 4/2017 | Uchihara | B60W 20/10 |
| 10,802,682 | B2 * | 10/2020 | Cheng | G06F 3/0484 |

(Continued)

FOREIGN PATENT DOCUMENTS

JP 2015162019 A * 9/2015

*Primary Examiner* — James J Lee
*Assistant Examiner* — Wenyuan Yang
(74) *Attorney, Agent, or Firm* — Morgan, Lewis & Bockius LLP

(57) ABSTRACT

An apparatus for controlling multimedia of a vehicle includes: a display to display a route guiding screen or a content screen; and a controller to control the display to display the route guiding screen or the content screen based on an active screen switching manner or a non-switching manner. A driver is prevented from deviating from a route because the driver fails to see the route guiding screen or prevented from inconveniently performing the additional handling of the driver to switch to the route guiding screen.

18 Claims, 5 Drawing Sheets

(56) References Cited

U.S. PATENT DOCUMENTS

| | | | |
|---|---|---|---|
| 2003/0018427 A1* | 1/2003 | Yokota | G01C 21/367 |
| | | | 701/455 |
| 2006/0256094 A1* | 11/2006 | Inagaki | G01C 21/3611 |
| | | | 345/173 |
| 2007/0052546 A1* | 3/2007 | Minagawa | G01C 21/3694 |
| | | | 340/815.4 |
| 2008/0297488 A1* | 12/2008 | Operowsky | G01C 21/3629 |
| | | | 345/173 |
| 2009/0132161 A1* | 5/2009 | Akita | G01C 21/3647 |
| | | | 701/532 |
| 2011/0187547 A1* | 8/2011 | Kweon | H04M 1/57 |
| | | | 340/670 |
| 2015/0015479 A1* | 1/2015 | Cho | G06F 3/1423 |
| | | | 345/156 |
| 2016/0188276 A1* | 6/2016 | Li | G06F 1/1641 |
| | | | 345/156 |
| 2017/0255352 A1* | 9/2017 | Omasa | G06F 3/04886 |
| 2017/0300216 A1* | 10/2017 | Helm | G09G 5/00 |

* cited by examiner

APPARATUS AND METHOD FOR CONTROLLING MULITMEDIA OF VEHICLE

CROSS-REFERENCE TO RELATED APPLICATION

This application claims the benefit of priority to Korean Patent Application No. 10-2018-0154729, filed in the Korean Intellectual Property Office on Dec. 4, 2018, the entire contents of which are incorporated herein by reference.

TECHNICAL FIELD

The present disclosure relates to an apparatus and a method for controlling multimedia of a vehicle.

BACKGROUND

An Audio Video Navigation (AVN) device for a vehicle is a multimedia device for a vehicle provided by integrating an audio device, a video device, and a navigation device with each other.

The audio device provides audio services through radios and compact disks (CDs), the video device provides video services through digital versatile disks (DVDs), and navigation provides route guiding services such as destination guiding functions.

In general, a driver drives a vehicle while seeing a route guiding screen in the state that a destination guiding function is set up. When a content function is activated in the state that the destination guiding function is activated, the route guiding screen is switched to a content screen.

When switching from the content screen to the route guiding screen, the content screen may be automatically switched to the route guiding screen after preset time (5, 10, or 20 seconds) elapses or may switched to the route guiding screen through the handling of a user before the preset time elapses.

Accordingly, a driver may deviate from a route to a destination because the driver fails to see the route guiding screen as a screen fails to be switched to the route guiding screen displayed before the preset time elapses or may fail to pay attention to driving the vehicle due to the additional handling of the driver.

SUMMARY

The present disclosure has been made to solve the above-mentioned problems occurring in the prior art while advantages achieved by the prior art are maintained intact.

An aspect of the present disclosure provides an apparatus and a method for controlling multimedia of a vehicle, capable of switching from a content screen to a route guiding screen within a set-up time to be appropriate to a driving situation.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling multimedia of a vehicle, includes a display to display a route guiding screen or a content screen, a controller to control the display to display the route guiding screen or the content screen based on an active screen switching manner or a non-switching manner.

In addition, the route guiding screen includes at least one of information on a route to a destination or map information.

The content screen includes at least one of audio information or video information.

The controller controls the display to display the content screen based on the non-switching manner, when a screen switching manner is not set up.

The controller controls the display to perform a display operation by switching from the content screen to the route guiding screen, based on the active screen switching manner or a fixing screen switching manner, when a screen switching manner is set up.

Further, the fixing screen switching manner includes a manner of switching from the content screen to the route guiding screen when preset time elapses.

The active screen switching manner includes a manner of switching from the content screen to the route guiding screen at a time point before the preset time elapses.

The time point before the preset time elapses includes a time point that a screen switching period of time, which is calculated in a first manner, elapses.

The first manner includes a manner of calculating the screen switching period of time based on one of a distance remaining till turn by turn (TBT) guidance, a vehicle speed, a distance from a starting point, a distance remaining to the destination, the number of texts on the content screen, road event information on the route, and information on a control camera on the route.

The controller calculates the screen switching time in a second manner, when a history of driving on the route exceeds a reference number of times.

The second manner includes a manner of calculating the screen switching period of time based on one of road event information on the route and information on a control camera on the route.

According to another aspect of the present disclosure, a method for controlling multimedia of a vehicle, includes generating a route based on an input of a destination, and displaying a route guiding screen or a content screen based on an active screen switching manner or a non-switching manner.

The route guiding screen includes at least one of information on a route to the destination or map information.

The content screen includes at least one of audio information or video information.

Further, the method further includes displaying the content screen based on the non-switching manner, when a screen switching manner is not set up.

The method further includes performing a display operation by switching from the content screen to the route guiding screen, based on the active screen switching manner or a fixing screen switching manner, when a screen switching manner is set up.

The fixing screen switching manner includes a manner of switching from the content screen to the route guiding screen when preset time elapses.

The active screen switching manner includes a manner of switching from the content screen to the route guiding screen at a time point before the preset time elapses.

The time point before the preset time elapses includes a time point that a screen switching period of time, which is calculated in a first manner, elapses.

The first manner includes a manner of calculating the screen switching period of time based on one of a distance remaining till turn by turn (TBT) guidance, a vehicle speed, a distance from a starting point, a distance remaining to the destination, the number of texts on the content screen, road event information on the route, and information on a control camera on the route.

The controller calculates the screen switching period of time in a second manner, when a history of driving on the route exceeds a reference number of times.

The second manner includes a manner of calculating the screen switching period of time based on one of road event information on the route and information on a control camera on the route.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
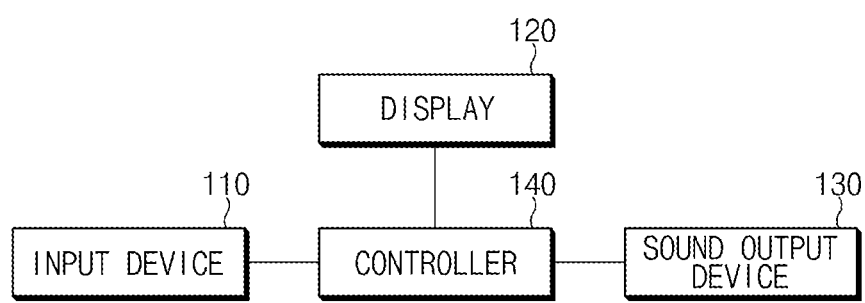
FIG. 1 is a block diagram illustrating an apparatus for controlling multimedia, according to an embodiment of the present disclosure.

Hereinafter, some embodiments of the present disclosure will be described in detail with reference to accompanying drawings. In the following description, the same reference numerals will be assigned to the same components even though the components are illustrated in different drawings. In addition, in the following description, a detailed description of well-known features or functions will be ruled out in order not to unnecessarily obscure the gist of the present disclosure.

In describing components of exemplary embodiments of the present disclosure, the terms 1st, 2nd, first, second, A, B, (a), (b), and the like may be used herein. These terms are only used to distinguish one component from another component, but do not limit the corresponding components irrespective of the order or priority of the corresponding components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating an apparatus for controlling multimedia, according to an embodiment of the present disclosure.

As illustrated in FIG. 1, according to an embodiment of the present disclosure, the apparatus for controlling the multimedia may include an input device 110, a display 120, a sound output device 130, and a controller 140.

According to an embodiment of the present disclosure, the apparatus for controlling the multimedia may refer to an apparatus for controlling an audio function, a video function, and a navigation function.

The input device 110 may output an input signal which is an electrical signal corresponding to the handling of a user.

The input device 110 may output an input signal for activating a content function corresponding to the handling of the user. For example, the input device 110 may output an input signal for activating the audio function, the video function, or the navigation function.

The input device 110 may output an input signal for activating screen switching, corresponding to the handling of the user.

The input device 110 may output an input signal for activating active screen switching, in response to the handling of the user, when the input signal for activating the screen switching is output.

The input device 110 may receive information on a destination, when outputting the input signal for activating the navigation function. The input device 110 may output an input signal corresponding to the input of the information on the destination, when receiving the information on the destination.

The input device 110 may be implemented with at least one of a scroll wheel, a button, a knob, a touch screen, a touch pad, a lever, a track ball, a motion sensor, or a voice recognition sensor or the combination thereof.

The display 120 may display audio information in the form of a text, when the input signal for activating the audio function is output from the input device 110.

For example, the display 120 may display radio frequency information or broadcasting information of a radio. In addition, the display 120 may display the name of a sound source, which is output, the name of an artist, or the like.

The display 120 may display video information including a photo or a moving picture, when the input signal for activating the video function is output from the input device 110.

The input device 110 may visually display a map and various pieces of information related to the map, when the input signal for activating the navigation function is output from the input device 110.

For example, the display 120 may display the map, a route displayed in overlap with the map, and various pieces of information (information on whether incident occurs, information whether a control camera is present) associated with the route.

In other words, the display 120 may display a route guiding screen including information on a route from a starting point to at least any one destination, expected standby time, or total required time.

The display 120 may continuously display the content screen without switching to a route guiding screen from the content screen, when the destination is not input to the input device 110.

The display 120 may continuously display the content screen without switching to a route guiding screen from the content screen, even if the input signal for screen switching is not received from the input device 110 to the controller 140.

The display 120 may display the route guiding screen by switching from the content screen to the route guiding screen based on a fixing screen switching manner, when the input signal for activating the active screen switching is not received from the input device 110 to the controller 140.

The display 120 may display the route guiding screen by switching from the content screen to the route guiding screen based on the active screen switching manner, when the input signal for activating the active screen switching is received from the input device 110 to the controller 140.

The display 120 may be implemented with a display device that employs a liquid crystal display (LCD) panel, a light emitting diode (LED) panel, organic light-emitting diode (OLED) panel, or a plasma display panel (PDP). The LCD may include a thin film transistor (TFT) LCD.

According to an embodiment, the display 120 may be implemented with a touch screen panel (TSP) as the display 120 is integrated with the input device 110.

The sound output device 130 may output a radio broadcast or a sound source, when the input signal for activating the audio function is output from the input device 110.

The sound output device 130 may output a sound included in a photo or a moving picture, when the input signal for activating the video function is output from the input device 110.

The sound output device 130 may audibly display a map and various pieces of information related to the map, when the input signal for activating the navigation function is output from the input device 110.

For example, the sound output device 130 may provide, for a user, a route or an event occurring on the route in the form of voice. The sound output device 130 may be implemented by using a speaker or associated parts.

The controller 140 may control the overall operation of the apparatus for controlling the multimedia, according to an embodiment of the present disclosure.

According to an embodiment, the controller 140 may perform the control operation to display, on the display 120, the route guiding screen thereon when a destination is input, may perform the control operation to display, on the display 120, the content screen by switching from the route guiding screen to content screen, when the content function is activated in the state that the route guiding screen is displayed, or may perform a control operation to switch from the content screen to the route guiding screen again, based on the non-switching manner, the fixing screen switching manner, or the active screen switching manner depending on the settings of the screen switching.

The controller 140 may control non-switching from the content screen to the route guiding screen and perform a control operation to display the content screen on the display 120, when the destination is not input to the input device 110.

The controller 140 may perform a control operation to display the content screen or the route guiding screen in any one of the non-switching manner, the fixing screen switching manner, or the active screen switching manner depending on the settings of the screen switching by the user, based on whether the input signal for activating the screen switching is received from the input device 110.

The controller 140 may perform a control operation to continuously display the content screen on the display 120 based on the non-switching manner, when the input signal for activating the screen switching is not received from the input device 110, that is, when the screen switching is not set up.

The controller 140 may perform a control operation to display the route guiding screen by switching from the content screen to the route guiding screen, based on a fixing screen switching manner, when the input signal for activating the active screen switching is not received from the input device 110.

In this case, the fixing screen switching refers to the switching to the route guiding screen without displaying the content screen when a certain period of time, by the user, selected from a plurality of preset period of times, elapses.

For example, the plurality of preset period of times may include 5 seconds, 10 seconds, or 20 seconds.

Accordingly, when the user selects 5 seconds, the controller 140 may perform a control operation to display the route guiding screen by switching to the route guiding screen when 5 seconds elapses after the content screen is displayed.

When the input signal for activating the active screen switching is received from the input device 110, that is, when the active screen switching is set up, the controller 140 may determine that route guidance has to be displayed for the user at a time point before the set time elapses, and may perform a control operation to display the route guiding screen on the display 120 in the active screen switching manner without displaying the content screen.

For example, the controller 140 may perform a control operation to display the route guiding screen by switching from the content screen to the route guiding screen at a time point before a preset time elapses, that is, a time point that a screen switching time calculated in a first manner elapses.

In this case, the first manner may refer to a manner of calculating the screen switching time based on any one of a distance remaining till turn by turn (TBT) guidance, a vehicle speed, a distance from a starting point, a distance remaining to the destination, the number of characters on the content screen, road event information on the route, and information on a control camera on the route.

According to an embodiment of the present disclosure, the equation of calculating the screen switching time in the first manner may be expressed as Equation 1.

$$\text{Screen switching time} = \text{preset switching time} * \{1 - (X1 + X2 + X3 + X4 + X5 + X6 + X7) * 0.1\} \quad \text{Equation 1}$$

In Equation 1, the preset screen switching time may refer to any one of 5 seconds, 10 seconds, and 20 seconds.

The controller 140 may set "X1" to "1" when it is determined that the remaining distance to the TBT guidance is less than the first distance, and may set "X1" to "0" when it is determined that the remaining distance to the TBT guidance is greater than or equal to the first distance. For example, the first distance may be 1 km.

The controller 140 may set "X2" to "1" when it is determined that a current speed of a vehicle is equal to or greater than the first speed, and may set "X2" to "0" when it is determined that the current speed of the vehicle is less than the first speed. For example, the first speed may be 80 km/h.

The controller 140 may set "X3" to "1" when it is determined that the distance from the starting point is equal to or less than a second distance, and may set "X3" to "0" when it is determined that the distance from the starting point exceeds the second distance. For example, the second distance may be 2 km.

The controller 140 may set "X4" to "1" when it is determined that the remaining distance to the destination is equal to or less than the second distance, and may set "X4" to "0" when it is determined that the remaining distance to the destination exceeds the second distance. For example, the second distance may be 2 km.

The controller 140 may set "X5" to "1" when the number of characters on the content screen is equal to or less than a specific number, and may set "X5" to "0" when the number of characters on the content screen exceeds the specific number.

For example, when the characters are Korean, the specific number may be 15. When the characters are English, the specific number may be 30.

The controller 140 may determine whether road event information on the route to the destination is present, may set "X6" to "1" when determining that the road event information is present, and may set "X6" to "0" when determining that the road event information is absent. In this case, the road event information may include accident information and road control information.

The controller 140 may determine whether a control camera is present on the route to the destination, may set "X7" to "1" when determining that the control camera is present, and may set "X7" to "0" when determining that the control camera is absent. In this case, the control camera may include a signal control camera and a speed control camera.

Accordingly, the controller 140 may calculate the screen switching time to 3.5 seconds by referring to Equation 1, when the user selects 5 seconds as the preset screen switching time, the remaining distance to the TBT guidance is less than the first distance, the distance to the destination is equal to or less than the second distance, or it is determined that the control camera is present on the route.

$$3.5=5*\{1-(1+0+0+1+0+0+1)*0.1\}$$

In other words, the controller 140 may control the switching from the content screen to the route guiding screen at the time point before the preset time elapses, that is, at the time point that the screen switching time (3.5 seconds) calculated in the first manner elapses, instead of switching the content screen to the route guiding screen after the preset time point (5 seconds) elapses, when the active screen switching is set.

According to another embodiment, the controller 140 may perform a control operation to continuously display the content screen based on the non-switching manner, when determining that the screen switching is not set in the state that the history of the driving of the route is absent.

When it is determined that the screen switching is set in the state that the history of the driving of the route to the destination is absent, the controller 140 may calculate the screen switching time based on Equation 1 described above, and may perform a control operation to display the route guiding screen by switching from the content screen to the route guiding screen when the calculated screen switching time elapses.

According to another embodiment, when it is determined that the screen switching is not set in the state that there is present the history of the driving of the route to the destination by the specific number of times, the controller 140 may perform a control operation such that the content screen is not switched to the route guiding screen.

When it is determined that the screen switching is set in the state that there is present the history of the driving of the route to the destination by the specific number of times, the controller 140 may calculate the screen switching time in the second manner, and may perform a control operation to display the route guiding screen by switching from the content screen to the route guiding screen at the time point when the screen switching time calculated in the second manner elapses.

According to an embodiment of the present disclosure, the screen switching time in the second manner may be expressed as Equation 2.

$$\text{Screen switching time} = \text{preset screen switching time} * \{1-(X6+X7)*0.1\} \quad \text{Equation 2}$$

In Equation 2, the preset screen switching time may refer to any one of 5 seconds, 10 seconds, and 20 seconds.

The controller 140 may determine whether road event information is present on the route to the destination, may set "X6" to "2" when it is determined that the road event information is present, and may set "X6" to "0" when it is determined that the road event information is absent. In this case, the road event information may include accident information and road control information.

The controller 140 may determine whether a control camera is present on the route to the destination, may set "X7" to "2" when determining that the control camera is present, and may set "X7" to "0" when determining that the control camera is absent. In this case, the control camera may include a signal control camera and a speed control camera.

Accordingly, the controller 140 may calculate the screen switching time to 6 seconds by referring to Equation 2, when the user selects 10 seconds as the preset screen switching time, it is determined that road event information is present on the route, and it is determined that the control camera is present on the route.

$$6=10*\{1-(2+2)*0.1\}$$

In other words, the controller 140 may perform a control operation to display the screen by switching from the content screen to the route guiding screen at the time point earlier than the preset time point, that is, at the time point that a screen switching time (6 seconds) calculated in the second manner, instead of displaying the screen by switching from the content screen to the route guiding screen after the preset time point (10 seconds) elapses when the screen switching is set.

Figure 2:
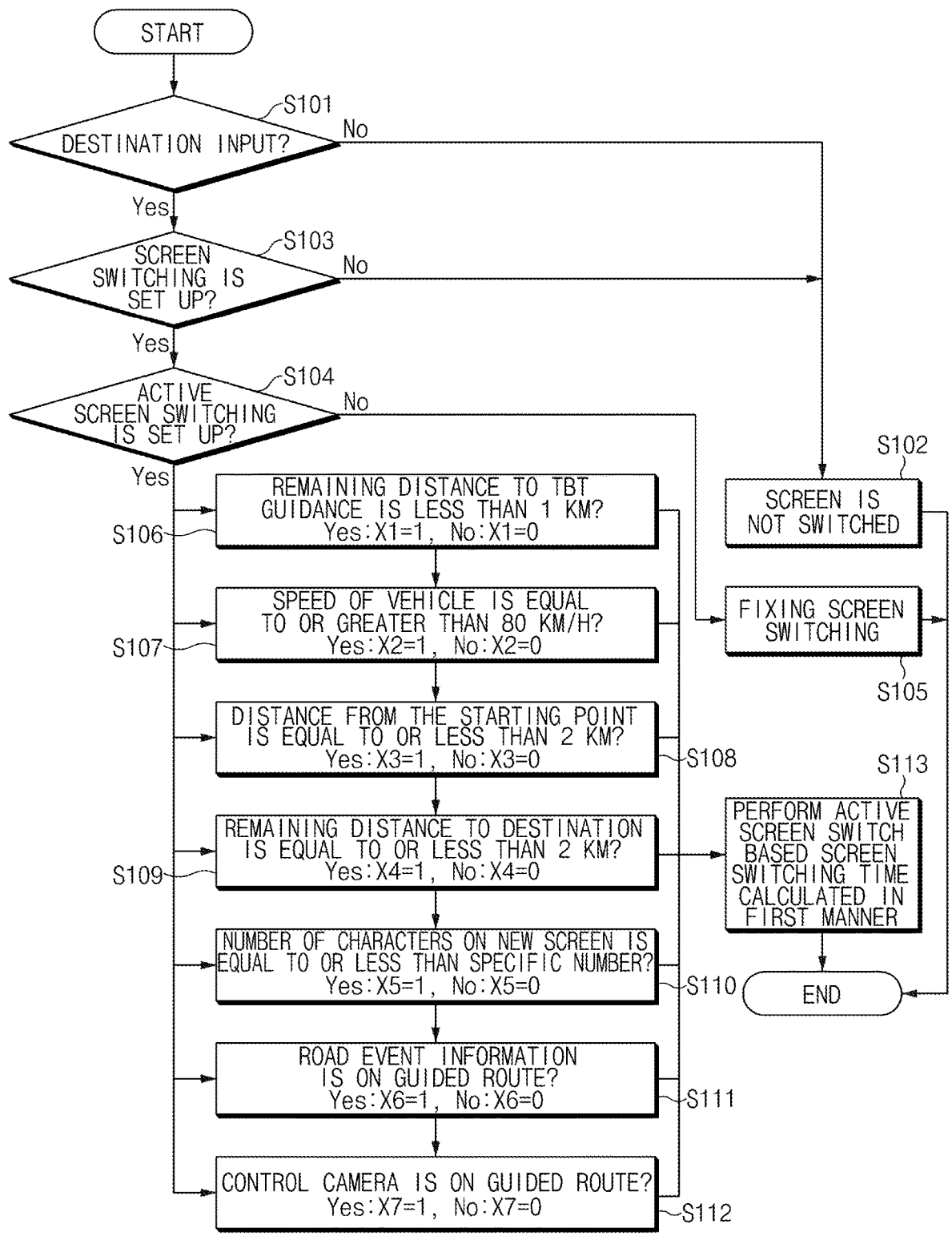
FIG. 2 is a flowchart illustrating a method for controlling multimedia, according to an embodiment of the present disclosure.

FIG. 2 is a flowchart illustrating a method for controlling multimedia, according to an embodiment of the present disclosure.

As illustrated in FIG. 2, the controller 140 determines whether the destination is input, based on an input signal output from the input device 110 (S101). In operation S101, the controller 140 may search for a route as the destination is input, and may perform a control operation to display, on the display 120, the route guiding screen including information on the route to the destination and map information.

The controller 140 does not switch a screen, when it is determined that the destination is not input to the input device 110 (S102). In operation S102, the controller 140 may perform a control operation to display the content screen on the display 120 without switching from the content screen to the route guiding screen.

The controller 140 determines whether the screen switching is set up, based on the input signal output from the input device 110 (S103), when it is determined that the destination is input to the input device 110 (Y).

When it is determined that the screen switching is not set up in operation S103, the controller 140 performs operation S102.

The controller 140 determines whether the active screen switching is set up, based on the input signal output from the input device 110 (S104).

When it is determined that the active screen switching is not set up (N), the controller 140 may perform a control operation to display the screen by switching from the content screen to the route guiding screen based on the fixing screen switching manner (S105). In operation S105, the fixing screen switching refers to that the controller 140 switches from the content screen to the route guiding screen when any one time, by the user, selected from a plurality of preset times, elapse In operation S105, the plurality of preset times may include 5 seconds, 10 seconds, or 20 seconds.

Accordingly, when the user selects 5 seconds, the controller 140 may perform a control operation to display the screen by switching to the route guiding screen when 5 seconds elapses after the content screen is displayed.

In operation S104, when it is determined that the active screen switching is set up (Y), the controller 140 may determine that route guiding screen has to be displayed for the user at a time point prior to the preset time.

The controller 140 may set "X1" to "1" when the remaining distance to the TBT guidance is less than the first distance, and may set "X1" to "0" when the remaining distance to the TBT guidance is equal to or greater than the first distance (S106). For example, the first distance may be 1 km.

The controller 140 may set "X2" to "1" when a current speed of a vehicle is equal to or greater than the first speed, and may set "X2" to "0" when the current speed of the vehicle to the TBT guidance is less than the first speed (S107). For example, the first speed may be 80 km/h.

The controller 140 may set "X3" to "1" when it is determined that the distance from the starting point is equal to or less than a second distance, and may set "X3" to "0" when determining that the distance from the starting point exceeds the second distance (S108). For example, the second distance may be 2 km.

The controller 140 may set "X4" to "1" when determining that the remaining distance to the destination is equal to or less than the second distance, and may set "X4" to "0" when determining that the remaining distance to the destination exceeds the second distance (S109). For example, the second distance may be 2 km.

The controller 140 may set "X5" to "1" when the number of characters on the content screen is equal to or less than a specific number, and may set "X5" to "0" when the number of characters on the content screen exceeds the specific number (S110). For example, when the characters are Korean, the specific number may be 15. When the characters are English, the specific number may be 30.

The controller 140 may determine whether road event information is present on the route to the destination, may set "X6" to "1" when it is determined that the road event information is present, and may set "X6" to "0" when it is determined that the road event information is absent (S111). In this case, the road event information may include accident information and road control information.

The controller 140 may determine whether a control camera is present on the route to the destination, may set "X7" to "1" when determining that the control camera is present, and may set "X7" to "0" when determining that the control camera is absent (S112). In this case, the control camera may include a signal control camera and a speed control camera.

The controller 140 calculates the screen switching time in the first manner by using the values of "X1" to "X7" set in operation s106 to operation s112 based on the active screen switching manner and performs a control operation to display the screen by switching from the content screen to the route guiding screen at the time point that the screen switching time, which is calculated in the first manner, elapses (S113).

In operation S113, the controller 140 may calculate the screen switching time in the first manner by using Equation 1 described above.

For example, in operation S113, the controller 140 may calculate the screen switching time to 3.5 seconds by referring to Equation 1, when the user selects 5 seconds as the preset screen switching time, the remaining distance to the TBT guidance is less than the first distance, the distance to the destination is equal to or less than the second distance, or it is determined that the control camera is present on the route.

In other words, the controller 140 may perform a control operation to display the screen by switching from the content screen to the route guiding screen at the time point before the preset time elapses, that is, at the time point that the screen switching time (3.5 seconds) calculated in the first manner elapses, instead of switching from the content screen to the route guiding screen after the preset time point (5 seconds) elapses, when the screen switching is set up.

Figure 3:
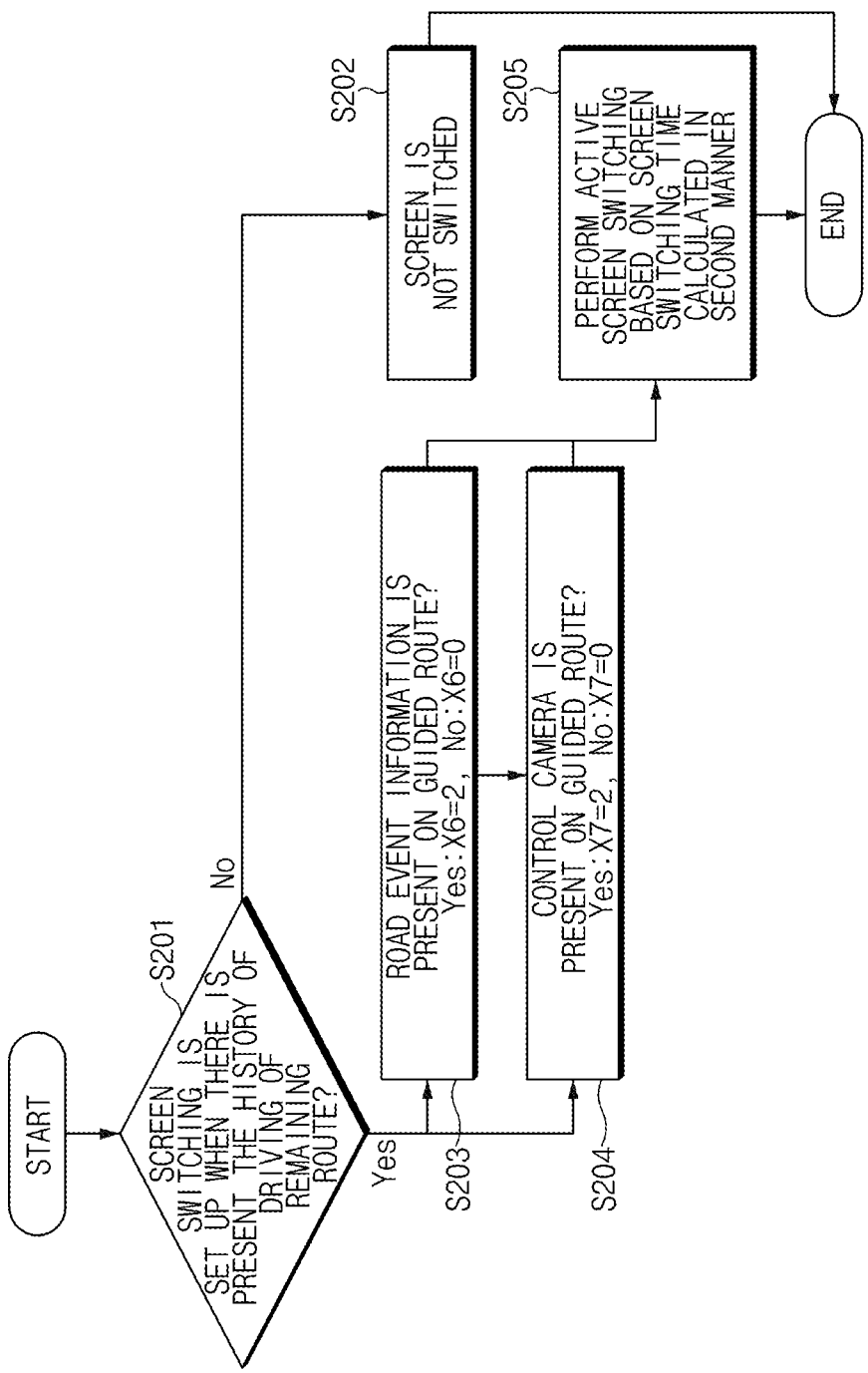
FIG. 3 is a flowchart illustrating a method for controlling multimedia, according to another embodiment of the present disclosure.

FIG. 3 is a flowchart illustrating a method for controlling multimedia, according to another embodiment of the present disclosure.

As illustrated in FIG. 3, the controller 140 determines whether the screen switching is set up in the state that there is present the history of the driving of the route to the destination by the specific number of times (S201).

In operation S201, when it is determined that the screen switching is not set in the state that there is present the history of the driving of the route to the destination by the specific number of times (N), the controller 140 may perform a control operation such that the content screen is not switched to the route guiding screen.

In operation S201, when it is determined that the screen switching is set in the state that there is present the history of the driving of the route to the destination by the specific number of times (Y), the controller 140 may determine whether the road event information is present on the route to the destination (S203).

In operation S203, the controller 140 may set "X6" to "2" when it is determined that the road event information is present, and may set "X6" to "0" when it is determined that the road event information is absent (S203). In this case, the road event information may include accident information and road control information.

The controller 140 may determine whether a control camera is present on the route to the destination, may set "X7" to "2" when determining that the control camera is present, and may set "X7" to "0" when determining that the control camera is absent (S204). In this case, the control camera may include a signal control camera and a speed control camera.

The controller 140 calculates the screen switching time in the second manner by using the values of "X6" and "X7" set in operation S203 to operation S204 based on the active screen switching manner and performs a control operation to display the screen by switching from the content screen to the route guiding screen at the time point that the screen switching time, which is calculated in the second manner, elapses (S205).

In operation S205, the controller 140 may calculate the screen switching time in the second manner by using Equation 2.

Accordingly, in operation S205, the controller 140 may calculate the screen switching time to 6 seconds by referring to Equation 2, when the user selects 10 seconds as the preset screen switching time, it is determined that road event information is present on the route, and it is determined that the control camera is present on the route.

In other words, the controller 140 may perform a control operation to display the screen by switching from the content screen to the route guiding screen at the time point before the preset time elapses, that is, at the time point that the screen switching time (6 seconds) calculated in the second manner elapses, instead of switching from the content screen to the route guiding screen after the preset time point (10 seconds) elapses, when the screen switching is set up.

Figure 4:
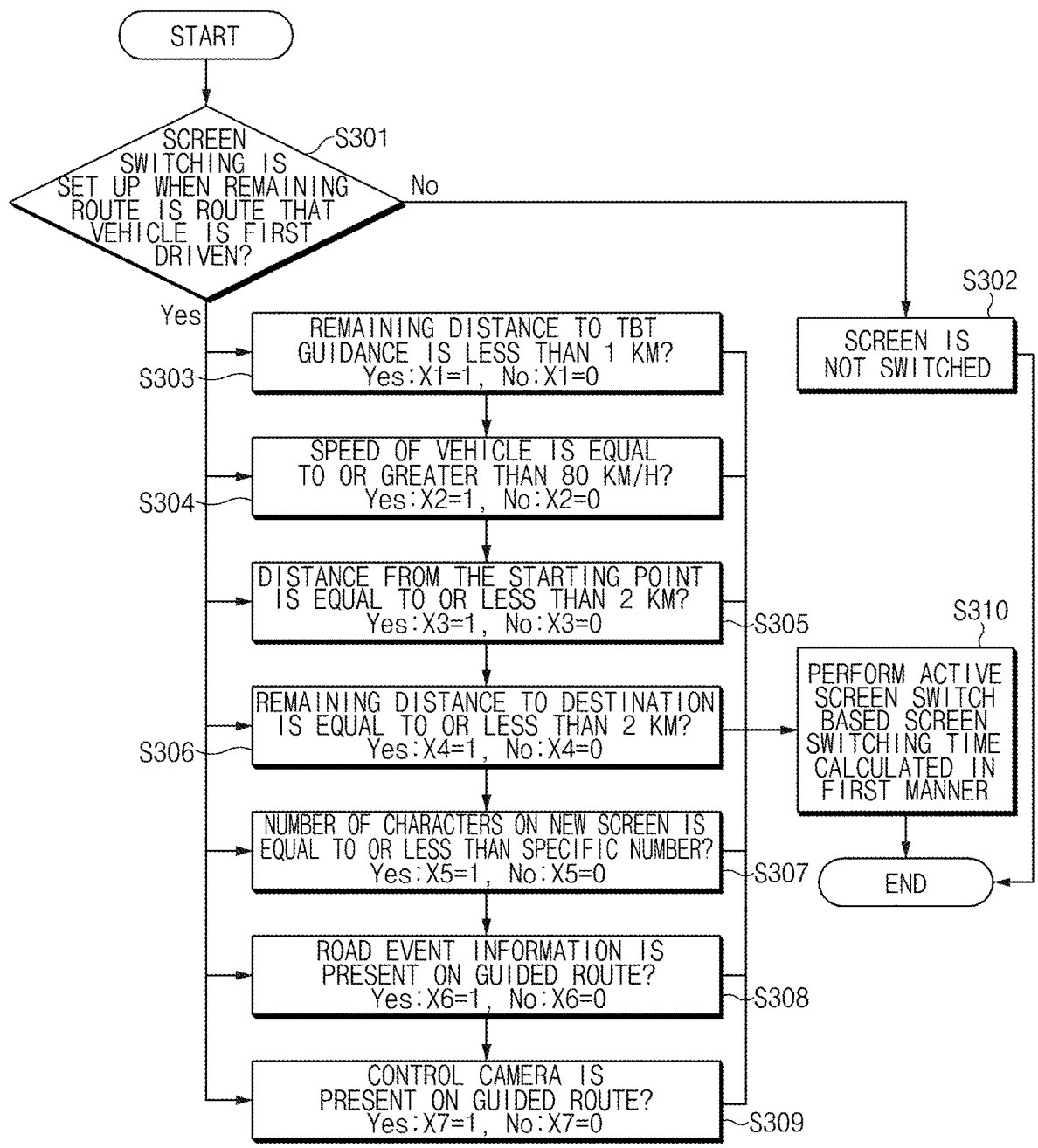
FIG. 4 is a flowchart illustrating a method for controlling multimedia, according to still another embodiment of the present disclosure.

FIG. 4 is a flowchart illustrating a method for controlling multimedia, according to still another embodiment of the present disclosure.

As illustrated in FIG. 4, the controller 140 determines whether the screen switching is set up in the state that there is present the history of the driving of the route to the destination by the specific number of times (S301).

When it is determined that the screen switching is not set in the state that there is absent the history of the driving of the route to the destination (N), the controller 140 may perform a control operation such that the content screen is not switched to the route guiding screen (S302).

When it is determined that the screen switching is set in the state that there is absent the history of the driving of the route to the destination (Y), the controller 140 may perform operation S303 to S309 based on the active screen switching manner to calculate the screen switching time in the first manner and perform a control operation to display the screen by switching from the content screen to the route guiding screen at the time point that the screen switching time, which is calculated in the first manner, elapses (S310). In this case, the details of operation S303 to S309 are omitted because they are the same as the details of operations s106 to s112 of FIG. 2.

Figure 5:
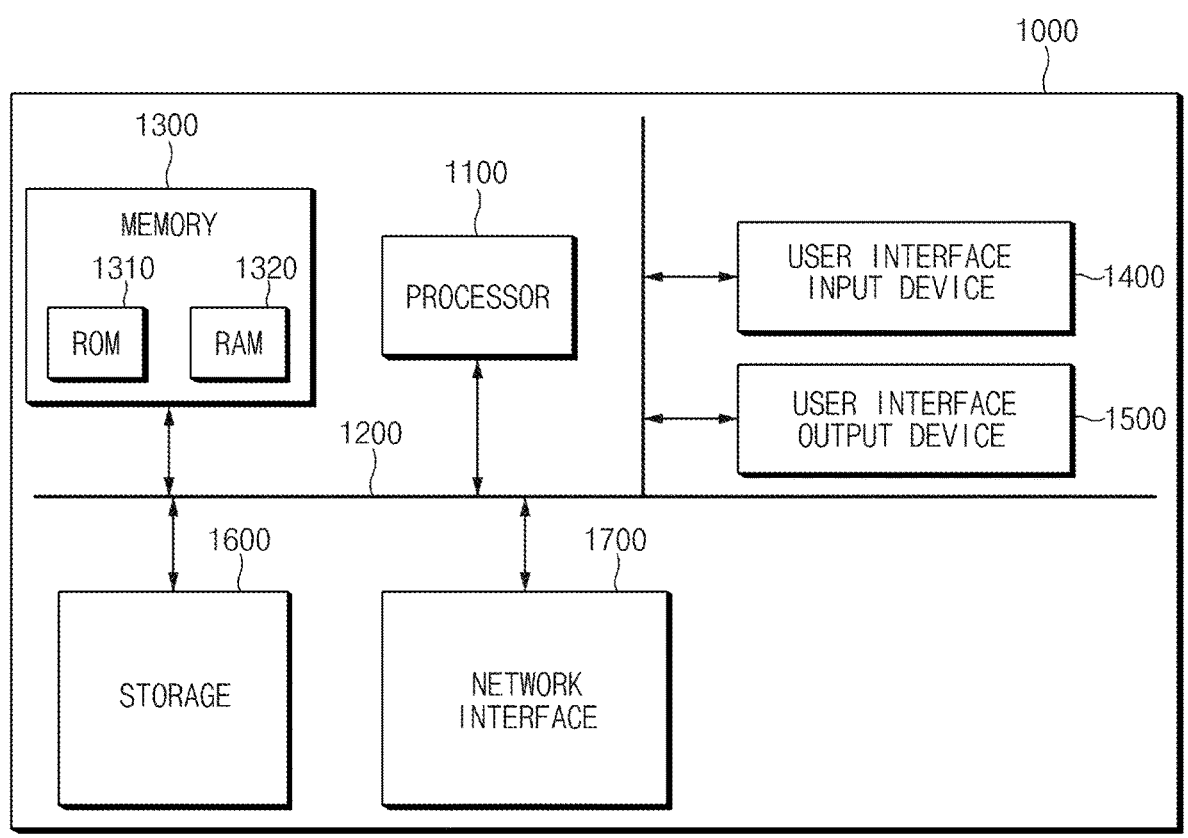
FIG. 5 is a block diagram illustrating a computing system to execute the method, according to an embodiment of the present disclosure.

FIG. 5 is a block diagram illustrating a computing system to execute the method, according to an embodiment of the present disclosure.

Referring to FIG. 5, a computing system 1000 may include at least one processor 1100, a memory 1300, a user interface input device 1400, a user interface output device 1500, storage 1600, or a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM; see 1310) and a random access memory (RAM; see 1320).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to an embodiment of the present disclosure, in the apparatus and the method for controlling the multimedia of the vehicle, the time taken to switch the content screen to the route guiding screen may be calculated to be appropriate to the driving situation, and the switching from the content screen to the route guiding screen is performed when the calculated time elapses, thereby preventing the driver from deviating from the route as the driver fails to see the route guiding screen or from inconveniently performing the additional handling of the driver to switch to the route guiding screen.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus for controlling multimedia of a vehicle, the apparatus comprising:
   a display configured to display a route guiding screen; and
   a controller configured to, when a content function is activated in a state that the route guiding screen is displayed:
   display a content screen by switching from the route guiding screen to the content screen, and
   return back from the content screen to the route guiding screen at a time point by which a screen switching period of time has elapsed,
   wherein the screen switching period of time is calculated, in a first manner, based on one of a distance remaining until turn by turn (TBT) guidance, a vehicle speed, a distance from a starting point, a distance remaining to a destination, road event information on a route to the destination, or information on a control camera on the route, and
   the screen switching period of time is calculated, in a second manner, based on a number of texts on the content screen, wherein, when the number of texts on the content screen is equal to or less than a specific number, the calculated screen switching period of time is smaller than a preset period of time.

2. The apparatus of claim 1, wherein the route guiding screen includes at least one of information on a route to a destination or map information.

3. The apparatus of claim 1, wherein the content screen includes at least one of audio information or video information.

4. The apparatus of claim 1, wherein the controller controls the display to display the content screen based on a non-switching manner, when a screen switching manner is not set up.

5. The apparatus of claim 1, wherein the controller controls the display to perform a display operation by switching from the content screen to the route guiding screen, based on an active screen switching manner or a fixing screen switching manner, when a screen switching manner is set up.

6. The apparatus of claim 5, wherein the fixing screen switching manner includes a manner of switching from the content screen to the route guiding screen when the preset period of time elapses.

7. The apparatus of claim 6, wherein the active screen switching manner includes a manner of switching from the content screen to the route guiding screen at a time point before the preset period of time elapses.

8. The apparatus of claim 7, wherein the controller calculates the screen switching period of time in a third manner, when a history of driving on a route exceeds a reference number of times.

9. The apparatus of claim 8, wherein the third manner includes a manner of calculating the screen switching period of time based on one of the road event information on the route or the information on the control camera on the route.

10. A method for controlling multimedia of a vehicle, the method comprising steps of:
generating, by a controller, a route based on an input of a destination;
when a content function is activated in a state that a route guiding screen is displayed, displaying a content screen by switching from the route guiding screen to the content screen, and
returning back from the content screen to the route guiding screen at a time point by which a screen switching period of time has elapsed,
wherein the screen switching period of time is calculated, in a first manner, based on one of a distance remaining until turn by turn (TBT) guidance, a vehicle speed, a distance from a starting point, a distance remaining to a destination, road event information on a route to the destination, or information on a control camera on the route, and
the screen switching period of time is calculated, in a second manner, based on a number of texts on the content screen, wherein, when the number of texts on the content screen is equal to or less than a specific number, the calculated screen switching period of time is smaller than a preset period of time.

11. The method of claim 10, wherein the route guiding screen includes at least one of information on a route to the destination or map information.

12. The method of claim 10, wherein the content screen includes at least one of audio information or video information.

13. The method of claim 10, further comprising a step of displaying the content screen based on a non-switching manner, when a screen switching manner is not set up.

14. The method of claim 10, further comprising a step of performing a display operation by switching from the content screen to the route guiding screen, based on an active screen switching manner or a fixing screen switching manner, when a screen switching manner is set up.

15. The method of claim 14, wherein the fixing screen switching manner includes a manner of switching from the content screen to the route guiding screen when the preset period of time elapses.

16. The method of claim 15, wherein the active screen switching manner includes a manner of switching from the content screen to the route guiding screen at a time point before the preset period of time elapses.

17. The method of claim 16, wherein the controller calculates the screen switching period of time in a third manner, when a history of driving on the route exceeds a reference number of times.

18. The method of claim 17, wherein the third manner includes a manner of calculating the screen switching period of time based on one of the road event information on the route or the information on the control camera on the route.

* * * * *